Nov. 27, 1928.
A. E. PENFOLD
1,693,315
METHOD OF MAKING GOLF BALLS AND ARTICLES PRODUCED THEREFROM
Original Filed Nov. 4, 1922
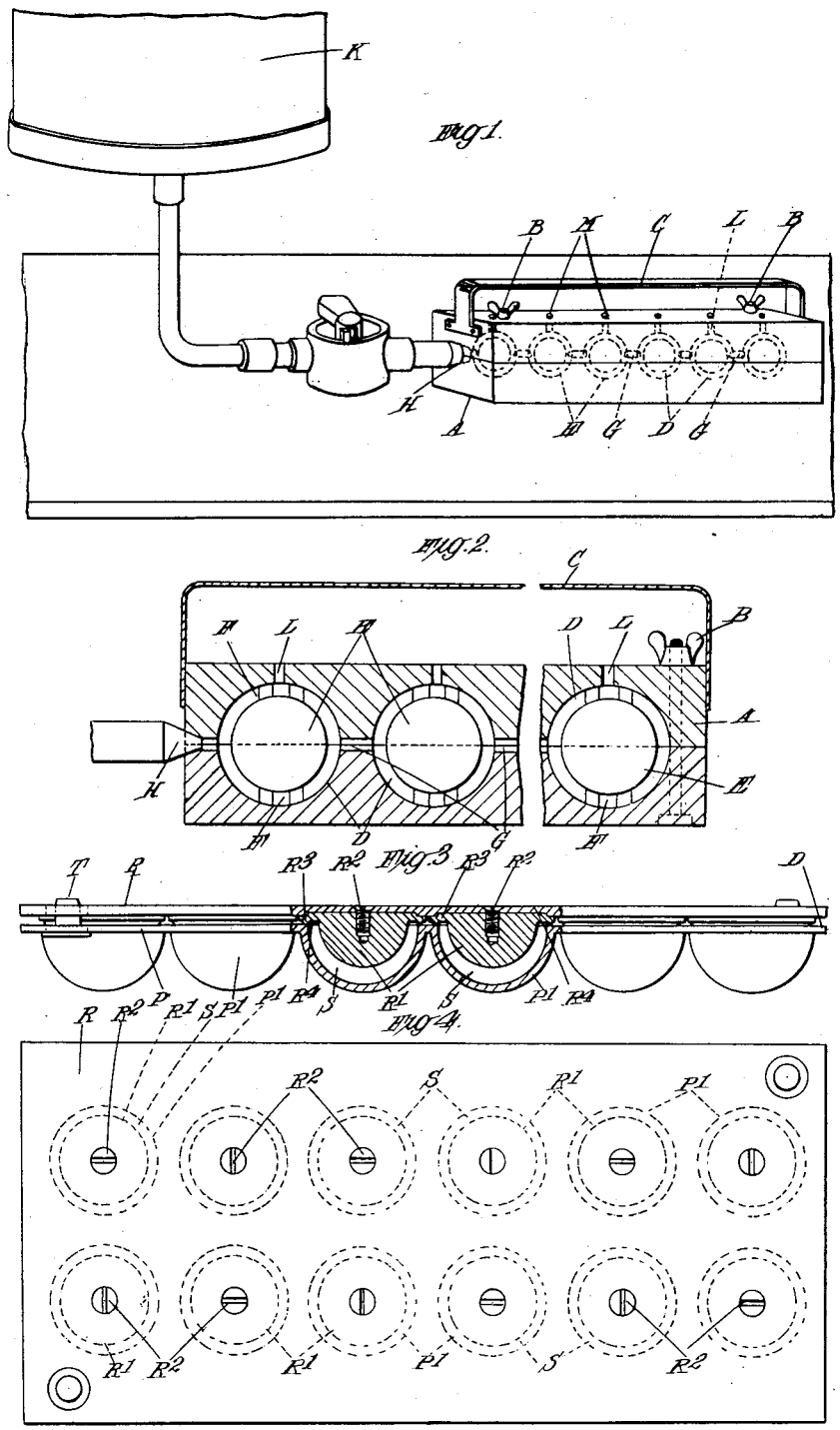

Patented Nov. 27, 1928.

1,693,315

UNITED STATES PATENT OFFICE.

ALBERT ERNEST PENFOLD, OF BIRMINGHAM, ENGLAND, ASSIGNOR TO THE DUNLOP RUBBER COMPANY, LIMITED, OF LONDON, ENGLAND.

METHOD OF MAKING GOLF BALLS AND ARTICLES PRODUCED THEREFROM.

Original application filed November 4, 1922, Serial No. 599,067, and in Great Britain December 10, 1921. Divided and this application filed July 27, 1925. Serial No. 46,463.

This invention relates to the manufacture of golf balls and has particular though not exclusive reference to the manufacture or formation of the outer cover or shell from a solution of gutta percha and/or balata with or without the addition of india rubber (hereinafter referred to as gutta percha solution) for surrounding a core or interior filling, such as set forth in my Patent No. 1,562,912, of the application for which the present case is a division.

According to this invention the gutta percha or the like is treated with a solvent under the required temperature conditions so as to dissolve the gutta percha and the warm solution so obtained is caused to assume the required shape in any appropriate manner whereupon the solution is chilled in order to precipitate the gutta percha. The chilling is preferably such as to subject the solution to a sudden and substantial reduction in temperature. In the treatment of gutta percha with a solvent such as petroleum spirit, at a temperature in the neighbourhood of about 110° F. it will be easily dissolved, although at lower temperatures such for example as below 90° F., purified gutta percha is unaffected by contact with this solvent. By maintaining the temperature of the solution above the limiting temperature at which the gutta percha does not dissolve, the gutta percha will remain dissolved in the solvent, but on chilling to a temperature below that at which the solvent power of the spirit for the material in question is effective (in the case of petroleum spirit below about 90° F.) the gutta percha immediately commences to precipitate out and at the same time takes down with it solvent as "spirit of crystallization". The precipitation can be effected more rapidly in proportion to the suddenness of the chilling and in carrying out the process the temperature is preferably suddenly reduced by a substantial amount say down to about 35° F. so as to expedite the precipitation. With other solvents the respective temperatures for dissolving and precipitating the gutta percha vary according to the particular solvent selected for use. It is to be understood that the essential feature of the present invention consists in shaping the gutta percha solution into the form as required for use in the actual construction or formation of the golf ball and chilling the solution after it is so shaped; for example in making an outer cover or shell from the gutta percha solution according to one method the warm solution prepared as aforesaid may be applied to the core in one or more operations, the applied solution then being chilled as aforesaid. The solution may be caused to cover each half of the core separately and chilling of the solution may be effected after each application.

According to another method, hemispherical cups may be formed from the solution and after the solution is caused to assume the hemispherical cup like formation it is chilled as aforesaid so that the cups of gutta percha so formed may be applied to the core. In such and similar methods I may use containers, moulds or the like, by means of which for example the solution may be caused to cover the golf ball core in one or more operations, or may be caused to cover a hemispherical former in the production of gutta percha cups as aforesaid, such containers, moulds or the like being adapted to be cooled by ice water, cold brine or other medium for chilling the solution as aforesaid. The chilling of the solution may however, be effected in any appropriate manner. In the case of applying the solution to a rubber wound core, the rubber windings of the latter may first be protected by the application of any suitable substance or layer which will prevent the solvent in the mass of the solution applied to form the outer cover or shell from acting on the rubber windings so as to avoid the likelihood of the latter being snapped or weakened by the solvent. This feature however forms the main feature of the invention described in the aforesaid specification of my application hereinbefore referred to. The gutta percha covering on the ball is finally moulded in any appropriate manner.

In order that my invention may be more clearly understood and readily carried into effect I will first describe more fully various methods in which an outer cover or shell is formed by applying the gutta percha solution to the golf ball core, and later I will describe the methods in which hemispherical cups or shells are made from the gutta percha solution ready for application to the golf ball cores, certain of the various methods being described with reference to the accompanying drawings in which:—

Figure 1 is a diagrammatic view showing one construction of mould for enabling the gutta percha solution to be applied to the whole of the golf ball core.

Figure 2 is a vertical longitudinal section taken through the middle of the mould shown in Figure 1.

Figures 3 and 4 are respectively a side view (partly in section) and a plan of one construction of mould in which the hemispherical cups are formed from the gutta percha solution.

In forming outer covers or shells according to one method, I may employ trays or plates having hemispherical depressions each of which is supplied with a quantity of the warm gutta percha solution which may be prepared by dissolving gutta percha with petroleum spirit under the temperature conditions hereinbefore referred to; the solution may be maintained at a temperature of about 110° F. as hereinbefore stated, in a heated tank or container from which the warm solution is drawn or supplied as required. The cores (which if of the rubber wound type are first protected as aforesaid) are placed in these depressions so that half of each core is immersed in and covered with the solution and in order to ensure uniform covering, small locating pins are provided in each depression to retain the core out of contact with the bottom or surrounding wall of the depression. The tray may then be subjected to a sudden chill, for example by placing it in ice water which causes the temperature of the solution to be suddenly and substantially reduced and in the space of about five to ten minutes the gutta percha is precipitated or solidified on to the lower half of the core. The cores half covered with the gutta percha are removed from the depressions and then placed in the reverse positions in warm gutta percha solution contained in similar depressions in another tray or plate so that the uncovered halves of the cores are immersed in the warm solution which is then chilled in the manner aforesaid to cause the gutta percha to be precipitated and solidified on the cores thus completely covering the whole of each core. If desired the solution may be caused to flow into the depressions from a suitable source of supply so as to surround the parts of the cores supported in the depressions. Instead of covering the core in two operations the whole of the core may be covered with solution in one operation by causing the solution to flow around the core in an enclosing box or mould. An example of the means for carrying out this method is illustrated in Figures 1 and 2 of the accompanying drawings: A indicates a mould or box generally which as shown comprises upper and lower parts adapted to be detachably secured together by means of bolts and wing nuts B, the upper part of the box having a handle C for enabling the upper part to be readily moved and also the complete box to be readily shifted as required. The two parts are provided with registering hemispherical depressions which when the two parts are closed form spaces D in which the golf ball cores E are contained. The cores are placed in the lower depressions and supported on small locating pins F and similar locating pins in the depressions in the upper part of the box serve to retain the cores against movement when the upper part is placed on and secured to the lower part. The several spaces E communicate by means of connecting passages G, one end of the box being completely closed, whilst the other end is formed with an opening to receive a nozzle H on a valve controlled pipe J leading from a tank K containing the solution which is maintained in a heated condition for example by a hot water jacket or other suitable means. The nozzle H and the opening in the box in which it fits may be tapered so as to provide a simple "push" connection between the pipe J and the box. If desired a readily operated screw connection may be provided instead of the push connection. Vent holes L connected with the spaces D are provided in the upper part of the box and may be closed when required for example by plugs M as indicated in Figure 1. The vent holes are open at the commencement of the operation of applying the solution to the cores, and after a good joint has been made between the box A and the nozzle H, the valve on the pipe J is operated to allow the warm solution to flow from the tank into the space D surrounding the first core whereupon it flows through the connecting passages G into the succeeding spaces D. The flow of the solution can be observed through the vent holes in succession and as the solution is seen in each vent hole the latter is closed by inserting a plug to prevent the solution from flowing out of that vent hole. After the last vent hole has been plugged the valve is closed to stop the flow and the box is disconnected from the nozzle and the box is disconnected from the nozzle and the box is placed into a tank on the supply pipe J and placed into a tank or trough containing ice water or the like which rapidly chills the solution surrounding the cores in the box and causes the gutta percha to be precipitated or solidified on the cores. After the chilling operation the box is removed from the "ice bath" and the two parts are separated whereupon the cores covered with the gutta percha are removed and allowed to stand so that the solvent may evaporate.

The protection of rubber wound cores to prevent the solvent in the mass of applied solution which is to form the cover from acting on the rubber windings of the core may be effected in any appropriate manner, for example by winding or wrapping a gutta percha strip around the core or by means of a gutta percha layer or cups covering the whole of the rubber wound core, the object of this protective covering of gutta percha as hereinbefore stated being to prevent the rubber tape or the like wound on the core from being snapped by the solvent in the gutta percha solution which is applied to the core to form the outer cover or shell. The said gutta percha cups may be formed by dipping a suitable shape or former in gutta percha solution and after evaporation of the solvent the cups are removed ready to be placed on the rubber wound core prior to the latter being covered with the gutta percha solution which is to form the outer cover. The feature of chilling the gutta percha solution may be employed in the formation of the protective layer of gutta percha or in the formation of any other part of the ball or in the formation of solid gutta percha balls from gutta percha solution.

I will now describe various methods of forming gutta percha cups or covers from the gutta percha solution which cups may be subsequently applied to or fitted on a golf ball core. According to one of these methods I provide a tray P having a number of hemispherical depressions P′ which tray forms the lower part of a two part mould, the other part of which is constituted by a plate R having a number of hemispherical projections or formers R′ which are adapted to fit in the said depressions in the lower mould part or tray so that cavities or moulding spaces S are formed between the inner surface of the depressions P′ and the outer surface of the hemispherical projections R′. The aforesaid projections R′ may be attached to the plate by screws R² or other suitable means and they are formed with flanges R³ which are suitably shaped to bear on the portions of the tray around the depressions formed therein. These flanges R³ may be provided with annular grooves R⁴ which form a slight continuation of the moulding spaces or cavities S between the depressions and the projections. The plate carrying the projections may be retained in the correct position on the tray by suitable locating means which for example may be in the form of pins T fixed on the tray and adapted to project into holes formed in the plate carrying the projections; the said pins may be coned or tapered at their outer ends to permit of the plate being readily placed in position, whilst the lower parts of the pins are cylindrical and make a close fit in the holes in the plate so that the projections on the plate are immovably maintained in the desired positions in the depressions in the tray. Prior to the fitting of the plate R on the tray P warm gutta percha solution may be supplied to the depressions P′ whereupon the said plate is placed on the tray so that the projections R′ dip into the solution in the depressions and cause the solution to fill moulding spaces or cavities S between the said depressions and projections with the result that upon the solidification of the solution in the said cavities S the gutta percha cups are produced. The precipitation of the gutta percha may be effected by subjecting the tray or complete mould to a sudden chill, for example by contact with ice water or cold brine as hereinbefore described. The gutta percha cups formed in this manner are ready to be applied to the golf ball cores and the application of the cups to the cores may be effected in any suitable or usual manner. In some cases the solution may be supplied to hemispherical moulding spaces or cavities, instead of supplying the solution to the depressions and then placing projections therein. For example, the various moulding spaces or cavities may be suitably connected by channels or passages and gutta percha solution may be poured or allowed to flow from a container into an opening communicating with the said connected spaces or cavities so that the solution flows into and fills the said spaces or cavities. If desired the cups may be produced by dipping a hemispherical former into gutta percha solution contained in a tank so that when withdrawn it will be covered with a layer of the solution which is allowed to solidify thereon. The former may be repeatedly dipped in the solution to obtain the desired thickness of gutta percha and the solution on the former may be chilled in any appropriate manner. In some instances the cores may be completely immersed or dipped in a warm gutta percha solution and after withdrawal the solution covered cores may be chilled in any appropriate manner.

After the cores have been covered with the gutta percha by methods such as above described the balls so formed are moulded in any suitable or usual manner.

What I claim and desire to secure by Letters Patent of the United States is:—

1. The manufacture of golf balls in which gutta percha or the like is employed in the formation of the ball comprising, treating the gutta percha with a solvent under the required temperature conditions to produce a warm solution, causing this warm solution to assume the shape of a covering member for a golf ball core, chilling the solution after being so shaped to precipitate the gutta percha, and moulding the cover on the said core.

2. In the manufacture of golf balls, having an outer cover or shell formed from gutta percha solution, the herein described method comprising causing the solution whilst warm to assume the required shape, subjecting the shaped solution to a sudden and substantial reduction of temperature to precipitate the gutta percha, and applying the cover so formed to a golf ball core.

3. In the manufacture of golf balls, having an outer cover or shell formed from gutta percha solution, the herein described method comprising applying the solution whilst warm to a forming surface in a mould, subjecting the mould to chilling treatment to effect a sudden and substantial reduction in temperature of the gutta percha solution to precipitate the gutta percha, and applying the cover so formed to a golf ball core.

4. In the manufacture of golf balls, having an outer cover or shell formed from gutta percha solution, the herein described method comprising forming the solution whilst warm into hemispherical portions for covering each half of a golf ball core, chilling the hemispherical portions of the solution as they are formed in order to precipitate the gutta percha, and applying the hemispherical portions to a golf ball core.

5. In the manufacture of golf balls, having an outer cover or shell formed from gutta percha solution, the herein described method comprising causing the solution whilst warm to spread by immersion therein of a hemispherical surface, chilling the solution after being so spread to precipitate the gutta percha, and applying the formed portions to a golf ball core.

6. The herein described method of making cover sections for golf balls, which comprises treating the gutta percha with a solvent under the required temperature conditions to produce a warm solution, causing such solution to assume the required shell-like shape, and chilling the solution after being so shaped.

7. As an article of manufacture, a shell member adapted to constitute part of a golf ball cover formed of gutta percha precipitated in such shape from a gutta percha solution by a chilling process.

ALBERT ERNEST PENFOLD.